United States Patent
Peng et al.

(10) Patent No.: US 8,012,377 B2
(45) Date of Patent: Sep. 6, 2011

(54) DOPED SEMICONDUCTOR NANOCRYSTALS AND METHODS OF MAKING SAME

(75) Inventors: Xiaogang Peng, Fayetteville, AR (US); Narayan Pradhan, Fayetteville, AR (US)

(73) Assignee: The Board of Trustees of the University of Arkansas, Little Rock, AR (US)

( * ) Notice: Subject to any disclaimer, the term of this patent is extended or adjusted under 35 U.S.C. 154(b) by 0 days.

(21) Appl. No.: 12/365,737

(22) Filed: Feb. 4, 2009

(65) Prior Publication Data
US 2009/0302304 A1 Dec. 10, 2009

Related U.S. Application Data

(62) Division of application No. 11/410,663, filed on Apr. 25, 2006, now Pat. No. 7,632,428.

(60) Provisional application No. 60/674,985, filed on Apr. 25, 2005.

(51) Int. Cl.
- H01B 1/02 (2006.01)
- H01B 1/08 (2006.01)
- H01B 1/12 (2006.01)
- H01B 1/06 (2006.01)
- H00B 1/10 (2006.01)

(52) U.S. Cl. .......... 252/512; 252/518.1; 252/519.4; 252/519.5; 427/58; 427/74; 427/64; 427/96.1; 427/96.2; 427/214; 427/97.1; 427/215; 427/99.2

(58) Field of Classification Search .......... 252/512, 252/518.1, 519.4, 519.5; 427/58, 74, 64, 427/96.1, 96.2, 214, 97.1, 215, 99.2
See application file for complete search history.

(56) References Cited

U.S. PATENT DOCUMENTS

| | | | | |
|---|---|---|---|---|
| 5,882,779 | A * | 3/1999 | Lawandy | 428/323 |
| 6,106,609 | A * | 8/2000 | Yang et al. | 117/11 |
| 6,225,198 | B1 * | 5/2001 | Alivisatos et al. | 438/497 |
| 6,306,736 | B1 * | 10/2001 | Alivisatos et al. | 438/497 |
| 6,319,607 | B1 * | 11/2001 | Barbera-Guillem et al. | 428/402.24 |
| 6,761,877 | B2 * | 7/2004 | Barbera-Guillem | 424/9.6 |
| 6,815,064 | B2 * | 11/2004 | Treadway et al. | 428/403 |
| 6,869,545 | B2 * | 3/2005 | Peng et al. | 252/301.6 S |
| 6,872,249 | B2 * | 3/2005 | Peng et al. | 117/68 |
| 6,939,604 | B1 * | 9/2005 | Guyot-Sionnest et al. | 428/323 |
| 7,105,051 | B2 * | 9/2006 | Peng et al. | 117/68 |
| 7,153,703 | B2 * | 12/2006 | Peng et al. | 436/524 |
| 7,160,525 | B1 * | 1/2007 | Peng et al. | 423/1 |
| 7,229,497 | B2 * | 6/2007 | Stott et al. | 117/68 |
| 7,244,413 | B2 * | 7/2007 | Barbera-Guillem | 424/9.6 |
| 7,273,904 | B2 * | 9/2007 | Peng et al. | 524/439 |
| 7,306,823 | B2 * | 12/2007 | Sager et al. | 427/217 |
| 7,390,568 | B2 * | 6/2008 | Kim et al. | 428/403 |
| 7,455,825 | B2 * | 11/2008 | Jun et al. | 423/561.1 |
| 7,482,059 | B2 * | 1/2009 | Peng et al. | 428/403 |
| 2002/0066401 | A1 * | 6/2002 | Peng et al. | 117/68 |
| 2004/0110002 | A1 * | 6/2004 | Kim et al. | 428/379 |
| 2005/0129947 | A1 * | 6/2005 | Peng et al. | 428/403 |
| 2005/0214536 | A1 * | 9/2005 | Schrier et al. | 428/403 |
| 2006/0211152 | A1 * | 9/2006 | Peng et al. | 438/3 |
| 2007/0194279 | A1 * | 8/2007 | Peng et al. | 252/301.4 F |
| 2008/0081016 | A1 * | 4/2008 | Peng et al. | 423/509 |
| 2009/0218550 | A1 * | 9/2009 | Koyakutty et al. | 252/512 |

FOREIGN PATENT DOCUMENTS

WO  WO 03050329 A2 * 6/2003
WO  WO 2004066361 A2 * 8/2004

* cited by examiner

*Primary Examiner* — Douglas McGinty
(74) *Attorney, Agent, or Firm* — J. Clinton Wimbish; Smith Moore Leatherwood LLP

(57) ABSTRACT

A method of synthesizing doped semiconductor nanocrystals. In one embodiment, the method includes the steps of combining a metal oxide or metal salt precursor, a ligand, and a solvent to form a metal complex in a reaction vessel; admixing an anionic precursor with the metal complex at a first temperature, $T_1$, sufficient to form a plurality of host nanocrystals; doping a metal dopant onto the plurality of the host nanocrystals at a second temperature, $T_2$, such that a layer of the metal dopant is formed substantially over the surface of a host nanocrystal that receives a metal dopant; and adding a mixture having the anionic precursor and the metal oxide or metal salt precursor at a third temperature, $T_3$, into the reaction vessel to allow regrowth of host nanocrystals on the surface of the layer of the metal dopant formed substantially over the surface of a host nanocrystal that receives a metal dopant to form a plurality of doped nanocrystals, wherein the doped nanocrystals show a characteristic of semiconductor.

35 Claims, 15 Drawing Sheets

(a) (b)

(a)

(b)

DOPED SEMICONDUCTOR NANOCRYSTALS AND METHODS OF MAKING SAME

CROSS-REFERENCE TO RELATED PATENT APPLICATION

The present application is a divisional of U.S. patent application Ser. No. 11/410,663 filed Apr. 25, 2006, now U.S. Pat. No. 7,632,428, which claims the benefit, pursuant to 35 U.S.C. §119(e), of provisional U.S. patent application Ser. No. 60/674,985, filed Apr. 25, 2005, entitled "DOPED SEMICONDUCTOR NANOCRYSTALS AND METHODS OF MAKING SAME," by Xiaogang Peng and Narayan Pradhan, which is incorporated herein by reference in its entirety.

Some references, which may include patents, patent applications and various publications, are cited and discussed in the description of this invention. The citation and/or discussion of such references is provided merely to clarify the description of the present invention and is not an admission that any such reference is "prior art" to the invention described herein. All references cited and discussed in this specification are incorporated herein by reference in their entireties and to the same extent as if each reference was individually incorporated by reference. In terms of notation, hereinafter, "[n]" represents the nth reference cited in the reference list. For example, [12] represents Aldana, J.; Lavelle, N.; Wang, Y.; Peng, X.; J. Am. Chem. Soc.; 2005; 127(8); 2496-2504.

BACKGROUND OF THE INVENTION

Semiconductor nanocrystals are promising materials for many important applications, ranging from biomedical labeling, light-emitting-diodes (LEDs), lasers, solar cells, spintrinics, etc. Among these applications, many of them are taking the advantage of the size dependent photoluminescence (PL) of the nanocrystals. Up to present, the best system has been cadmium chalcogenides, especially cadmium selenide (CdSe) nanocrystals. PL of CdSe nanocrystals has reached a high yield, high stability, and broad color range (about 500-650 nm). For instance, it is possible to have a single laser as the excitation source and read 10 or more labels in the visible window with relatively stable emission and reasonable brightness using CdSe nanocrystals.

Early inventions have substantially decreased the danger associated with synthesis of high quality cadmium chalcogenide nanocrystals. The methods, known as greener approaches, are now becoming the main stream in the field of semiconductor nanocrystals. However, the apparent and intrinsic toxicity of cadmium element has attracted numerous attentions in the field, especially in the past one to two years. Unfortunately, there is no other acceptable option among the semiconductor nanocrystals. Ultimately, Si and Ge nanocrystals could be a choice. However, their indirect bulk bandgap and poorly developed synthetic chemistry cast significant doubt on them. Zinc chalcogenides, namely ZnSe, ZnS, and also ZnO, are much less toxic and could be made as high quality nanocrystals using the greener approaches. Unfortunately, their emission window may only cover purple and UV (about 450 nm and above).

Other applications, such as for solar cells and nanoelectronics, of doped semiconductor nanocrystals have been considered to be much needed. For instance, without doped nanocrystals, p-n junctions in the nanometer regime would not be possible. p-n junctions are known as the corner stone in the field of electronics and optoelectronics. At present, however, it is understood that there is no practical method to make p- or n-doped semiconductor nanocrystals.

Therefore, a heretofore unaddressed need exists in the art to address the aforementioned deficiencies and inadequacies.

SUMMARY OF THE INVENTION

The present invention, in one aspect, relates to a method of synthesizing doped nanocrystals. In one embodiment, the method comprises the steps of combining a metal oxide or metal salt precursor, a ligand, and a solvent to form a metal complex in a reaction vessel; admixing an anionic precursor with the metal complex at a first temperature, T1, sufficient to form a plurality of host nanocrystals;

doping a metal dopant onto the plurality of the host nanocrystals at a second temperature, T2, such that a layer of the metal dopant is formed substantially over the surface of a host nanocrystal that receives a metal dopant; and adding a mixture having the chalcogenic precursor and the metal oxide or metal salt precursor at a third temperature, T3, into the reaction vessel to allow regrowth of host nanocrystals on the surface of the layer of the metal dopant formed substantially over the surface of a host nanocrystal that receives a metal dopant to form a plurality of doped nanocrystals. The method further comprises the step of annealing the plurality of doped nanocrystals at a fourth temperature, T4. These steps can be carried out in a single reaction vessel.

The temperatures, T1, T2, T3, and T4, are chosen to selectively activate a targeted precursor in each given step and may differ from each other. In one embodiment, T1 is in the range of about 240° C. to 350° C., T2 is in the range of about 120° C. to 180° C., T3 is in the range of about 180° C. to 240° C., and T4 is greater than 220° C., respectively.

The anionic precursor, such as chalcogenic precursors, is selected from non-metal elements from the Group V, VI, and VII in the Periodic Table. In one embodiment, a chalcogenic precursor is selected from the Group VI elements including Se, O, Te and S. The non-metal precursor can be used as either growth of the host semiconductor nanocrystal or as the non-metal dopant ion.

The metal oxide or metal salt precursor can be selected from zinc stearate, zinc acetate and manganese stearate. The metal oxide or metal salt precursor can also be selected from a Group I, Group II, Group III, Group IV metal, or a transition metal. The transition metal at least includes one of Zn, Cu, Ag, Ni, Co, Fe, Mn, Ti, Zr and rare earth elements. The group IV metal at least includes one of Sn and Pb. The group III metal at least includes one of Al, Ga, and In. The metal precursor is used for either growth of the host semiconductor or the metal dopant ion.

The solvent can be a coordinating solvent or a non-coordinating solvent. The coordinating solvent or the ligand can be selected from the group consisting of long-chain fatty amines, long-chain fatty acids, phosphine, phosphoric acids, and phosphine oxides. The non-coordinating solvent can be selected from hydrocarbon compounds, esters, ether, and water. The solvent can be selected from the group consisting of octadecene (ODE), tributyl phosphine (TBP) and octadecylamine (ODA). The solvent or the ligand can also be selected from the group consisting of dodecylamine (DA), hexadecylamine (HA), octadecylamine (OA), stearic acid (SA), lauric acid (LA), hexylphosphonic acid (HPA), tetradecylphosphonic acid (TDPA), and trioctylphosphine oxide (TOPO).

The method further comprises a step of adjusting the concentration of the dopant in the doping layer by varying the ratio of the metal oxide or metal salt precursor and/or the chalcogenic precursor to the metal dopant.

The doped nanocrystal as produced according to the method of the present invention shows a characteristic of a semiconductor, which can be used as a biological labeling reagent, a light-emitting-diodes (LED), a solar cell, an electronic device such as a solid state lighting device and the like.

The present invention, in another aspect, relates to a doped nanocrystal. In one embodiment, the doped nanocrystal comprises a core of a first semiconductor nanocrystal, or host nanocrystal, with an outer surface; a layer of material with at least one dopant growing on the outer surface of the core of a first semiconductor nanocrystal; and a thin layer of a second semiconductor formed substantially over the layer with the dopant.

The selection of metal and non-metal dopant is listed above.

Each of the first semiconductor nanocrystal and the thin layer of the second semiconductor is a semiconductor, such as a group IV semiconductor, a group II-VI semiconductor or a group III-V semiconductor, wherein the group IV semiconductor is selected from Si, Ge, and Sn, examples of the group II-VI semiconductors are selected from ZnSe, ZnO, ZnS, MnSe, MnS, MnTe, CuS, CuSe, CuTe, CaS, CaTe and CaSe, and examples of the group III-V semiconductors are GaN, GaP and GaAs, InN, InP, and InAs.

The first semiconductor for the core nanocrystal and the second semiconductor for the thin layer can be different or substantially identical.

For a typical doped nanocrystal, the core of a first semiconductor nanocrystal has a dimension of from about 1 to 100 nm, the layer with at least one dopant has a thickness of from about 1 to 100 nm, and the layer of a second semiconductor has a thickness of from about 1 to 1000 nm. The at least one dopant can be a metal or non-metal dopant.

The present invention, in yet another aspect, relates to a method of synthesizing doped nanocrystals. In one embodiment, the method comprises the steps of admixing a non-metal, such as chalcogenic, precursor and a metal dopant in a solvent at a first temperature, T1, sufficient to form a plurality of nanocrystal nuclei doped with the metal dopant in a reaction vessel; changing the first temperature, T1, to a second temperature, T2, such that the metal dopant becomes inactive chemically; and adding a metal oxide or metal salt precursor to the reaction vessel to allow the growth of a layer of host nanocrystals over a nanocrystal nucleus doped with the metal dopant so as to form a plurality of doped nanocrystals, wherein some of them each has a nucleus doped with the metal dopant and a layer of host nanocrystals substantially enclosing the nucleus. The method further comprises the step of annealing the plurality of doped nanocrystals at a third temperature, T3. The steps can be carried out in a single reaction vessel.

The temperatures, T1, T2, and T3, are chosen to selectively activate the targeted necessary precursor, and they can differ from each other. In one embodiment, T1 was chosen to be sufficiently high to enable the complete reaction of the dopant metal. precursor with a large excess of the non-metal precursor. This allows the choice of T2 and T3 without any constrain from T1.

The non-metal precursor can be selected from the group consisting of Se, Te and S. The metal oxide or metal salt precursor can be selected from zinc stearate, zinc myristate, zinc acetate and manganese stearate. The non-metal precursor can also be selected from the non-metal elements in Group III, Group IV, Group V, Group VI, and Group VII, wherein the non-metal precursor at least includes one of B, N, P, As, O, S, Se, Te, Cl, Br, and I. The metal oxide or metal salt precursor can also be selected from a Group I, Group II, Group III, and Group IV metal or a transition metal, wherein the transition metal at least includes one of Cd, Zn, Hg, Cu, Ag, Ni, Co, Fe, Mn, Ti, Zr, and the rare earth elements, the group IV metal at least includes one of Sn and Pb, and the group V metal at least include Al, Ga, and In. These metal precursors can be used as either the growth of host nanocrystal or the dopants.

The non-metal dopant can be selected from the non-metal elements in Group V, Group VI, and Group VII, wherein the non-metal dopant at least includes one of N, P, As, O, S, Se, Te, Cl, Br, and I.

The coordinating solvent or ligand can be selected from the group consisting of long-chain fatty amines, long-chain fatty acids, phosphoric acids, and phosphine oxides.

The coordinating solvent or ligand can be selected from the group consisting of tributyl phosphine (TBP) and octadecylamine (ODA). The coordinating solvent and ligand can also be selected from the group consisting of dodecylamine (DA), hexadecylamine (HA), octadecylamine (OA), trioctylamine, oleyl amine, stearic acid (SA), lauric acid (LA), hexylphosphonic acid (HPA), tetradecylphosphonic acid (TDPA), and trioctylphosphine oxide (TOPO).

The non-coordinating solvent can be selected from water, hydrocarbon compounds, and other non-aqueous liquids. The non-coordinating solvent can also be selected from octadecene (ODE), ether, and ester.

The method further comprises a step of adjusting the concentration of the dopant in a doped nucleus by varying the ratio of the metal oxide or metal salt precursor and/or the chalcogenic precursor to the metal dopant, wherein the concentration of the dopant in a doped nucleus is in the range of 0 to 100 atomic percent.

The doped nanocrystal as produced according to this method of the present invention shows a characteristic of a semiconductor, which can be used as a biological labeling reagent, a light-emitting-diodes (LED), a solar cell, an electronic device such as a solid state lighting device, and the like.

The present invention, in a further aspect, relates to a doped nanocrystal. In one embodiment, the doped nanocrystal comprises a core of a first semiconductor nanocrystal with an outer surface; and a layer of a second semiconductor substantially enclosing the outer surface of the core of a first semiconductor nanocrystal. A third or additional layer(s) of a third or additional semiconductors, with or without dopant, can also be grown over the layer of a second semiconductor.

The core of a first semiconductor nanocrystal is formed with at least one metal dopant doped into a non-metal precursor, wherein the non-metal precursor can be selected from the group consisting of Se, Te and S. The metal oxide or metal salt precursor can be selected from zinc stearate, zinc myristate, zinc acetate and manganese stearate. The non-metal precursor can also be selected from the non-metal elements in Group V, Group VI, and Group VII, wherein the non-metal at least includes one of N, P, As, O, S, Se, Te, Cl, Br, and I. The metal oxide or metal salt precursor can also be selected from a Group I, Group II, Group III, Group IV and group V metal or a transition metal, wherein the transition metal at least includes one of Cd, Zn, Hg, Cu, Ag, Ni, Co, Fe, Mn, Ti, Zr, and rare earth elements, the group IV metal at least includes one of Sn and Pb, and the group V metal at least include Al, Ga, and In. One or more non-metal dopants can also be doped into the core of the first semiconductor.

Each of the first semiconductor, the second semiconductor, the third, and additional semiconductors is a semiconductor, such as a group IV semiconductor, a group II-VI semiconductor or a group III-V semiconductor, wherein the group IV semiconductor is selected from Si, Ge, and Sn, the group II-VI semiconductor is selected from ZnSe, ZnO, ZnS, MnSe, CuS, CuSe, CuTe, CaS, CaTe and CaSe, and the group III-V semiconductor is selected from GaN, GaP and GaAs, InN, InP, and InAs. The first semiconductor and the second semiconductor can be either different or substantially the same, wherein the core of a first semiconductor nanocrystal has a dimension of from about 1 to 100 nm, and the layer of a second semiconductor has a thickness of from about 1 to 1000 nm.

Such doped semiconductor nanocrystals formed according to the methods provided by the present invention can be utilized as or in a biological labeling reagent, a light-emitting-diodes (LED), a solar cell, a laser, a spintrinics, an electronic device such as a solid state lighting device, or the like.

These and other aspects of the present invention will become apparent from the following description of the preferred embodiment taken in conjunction with the following drawings, although variations and modifications therein may be affected without departing from the spirit and scope of the novel concepts of the disclosure.

DETAILED DESCRIPTION OF THE INVENTION

Figure 1:
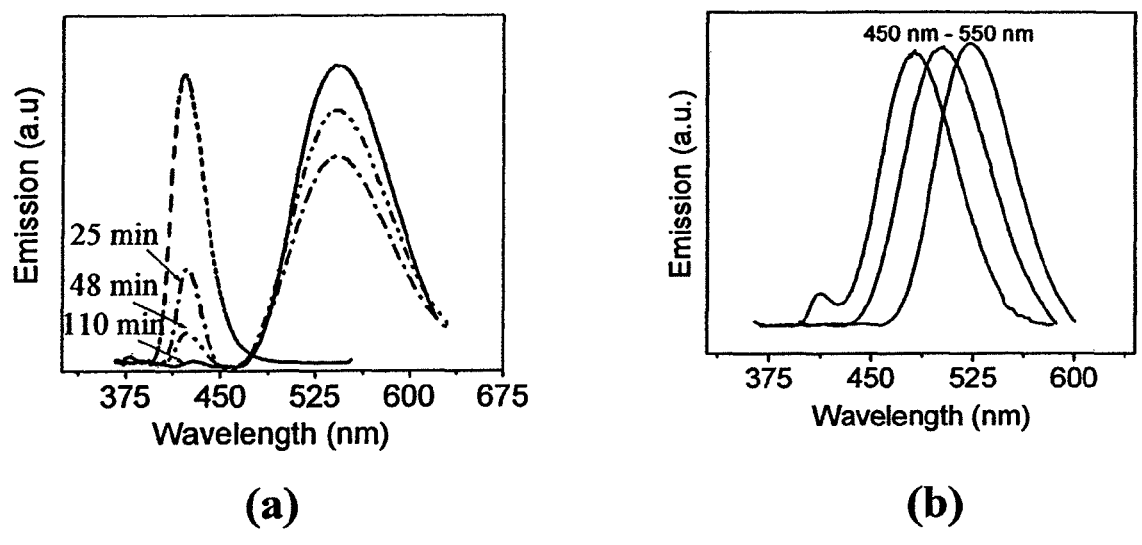
FIG. 1 shows spectropic graphs of (a) Cu2+ doping during annealing; and (b) size dependent tunable emission.

The present invention is more particularly described in the following examples that are intended as illustrative only since numerous modifications and variations therein will be apparent to those skilled in the art. Various embodiments of the invention are now described in detail. Referring to the drawings, like numbers indicate like parts throughout the views. As used in the description herein and throughout the claims that follow, the meaning of "a," "an," and "the" includes plural reference unless the context clearly dictates otherwise. Also, as used in the description herein and throughout the claims that follow, the meaning of "in" includes "in" and "on" unless the context clearly dictates otherwise.

DEFINITIONS

The terms used in this specification generally have their ordinary meanings in the art, within the context of the invention, and in the specific context where each term is used. Certain terms that are used to describe the invention are discussed below, or elsewhere in the specification, to provide additional guidance to the practitioner regarding the description of the invention. For convenience, certain terms may be highlighted, for example using italics and/or quotation marks. The use of highlighting has no influence on the scope and meaning of a term; the scope and meaning of a term is the same, in the same context, whether or not it is highlighted. It will be appreciated that the same thing can be said in more than one way. Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification, including examples of any terms discussed herein, is illustrative only, and in no way limits the scope and meaning of the invention or of any exemplified term. Likewise, the invention is not limited to various embodiments given in this specification.

As used herein, "around", "about" or "approximately" shall generally mean within 20 percent, preferably within 10 percent, and more preferably within 5 percent of a given value or range. Numerical quantities given herein are approximate, meaning that the term "around", "about" or "approximately" can be inferred if not expressly stated.

As used herein, the term "NCs" refers to nanocrystals.

OVERVIEW OF THE INVENTION

Doped nanocrystals are unique nanomaterials in many ways. Without them, nano-sized p-n junctions needed for nanostructured solar cells and electronics may not been produced. Doped semiconductor nanocrystals as an emitter can maintain most of the advantages of regular nanocrystals, simple requirements for excitation, tunable emission position by varying the dopants, strong and stable emission, general surface chemistry, etc. In addition to emission materials, doped nanocrystals are also considered as candidates for spintronics, quantum computation, electronics, optoelectronics, and multiple functional materials, etc. There are considerable amount of publications for the synthesis of doped bulk semiconductors and nanocrystals. For instance, Mn-doped bulk semiconductor emits around 580 nm [1]. This emission is widely studied and is due to 4T2-6A1 energy states of Mn2+. The methods reported so far for doping nanocrystals, however, cannot guarantee the doping of all nanocrystals in a sample, indicated by the additional emissions of exciton or surface states of the host nanocrystals [2-4]. Similarly, doping of other transition metal ions, such as Cu ion (Cu+ or Cu2+), inside the lattice structure of either ZnS or ZnSe, creates tunable emission from 450 nm to 550 nm. This emission is related to the transition between the conduction band and copper induced t2 states [5]. Synthesis methods reported so far through colloidal routes contain additional emissions like valence band-conduction band exciton transition from pure host nanocrystas and surface trap state to induced Cu t2 state emission. Furthermore, the emission quantum efficiency for the dopant-related emissions is typically low, from lower than 1% to about 20%.

What are needed in the field are methods which can yield pure doped nanocrystals, indicated by the pure dopant emission (>99%). These unique methods should also yield nanocrystals with comparable emission brightness and acceptable stability under given conditions using intrinsic semiconductor nanocrystal emitters as the standards. For instance, could be made water-soluble without damaging their PL brightness (>50% remaining brightness). For light-emitting-diodes (LEDs) and lasers applications, the nanocrystals must be stable under elevated temperatures, 100-300° C. For solid state lighting devices that use nanocrystal emitters as the phosphors (absorb high-energy emission from highly efficient LEDs and convert this emission to visible color), the nanocrystal emitters must have negligible self-quenching. Up to now, compositions with above performance parameters are not available and highly needed. The compositions provided by the present invention have reached or passed over all these requirements. The processes for making the same are unique. These new inventive aspects allow doping occurs either only in nucleation stage (core doping) or growth stage (shell doping). Furthermore, this invention allows these two doping strategies to be integrated together, which yields doped nanocrystals with multiple emission colors from a single nanocrystal. Interestingly, all these complex chemical processes can be completed in a one-pot reaction using generic, safe, and stable precursors (greener precursors).

Among other things, this invention provides new compositions/doped nanocrystals and methods of making same. These are core-doped and shell-doped nanocrystals with pure dopant PL (>99%), a useable PL quantum yield, and stable under high temperatures, and being compatible with commonly know ligand chemistry. Examples of such nanocrystals are disclosed although these examples shall not limit the possibilities of other structures, different dopants and/or different hosts. The methods for making these new structures are unique, which allows doping occurs either in nucleation phase or growth phase. The invention has been demonstrated in a simple one-pot configuration although they can be performed in separated steps in multi-pots configuration. These new inventive aspects also allow the creation of new compositions, more complex doped nanocrystals, such as multiple types of dopants in different locations of the core and different positions of the shell. The local host for different dopants can also be isolated by growing a barrier layer between two local hosts.

Figure 12:
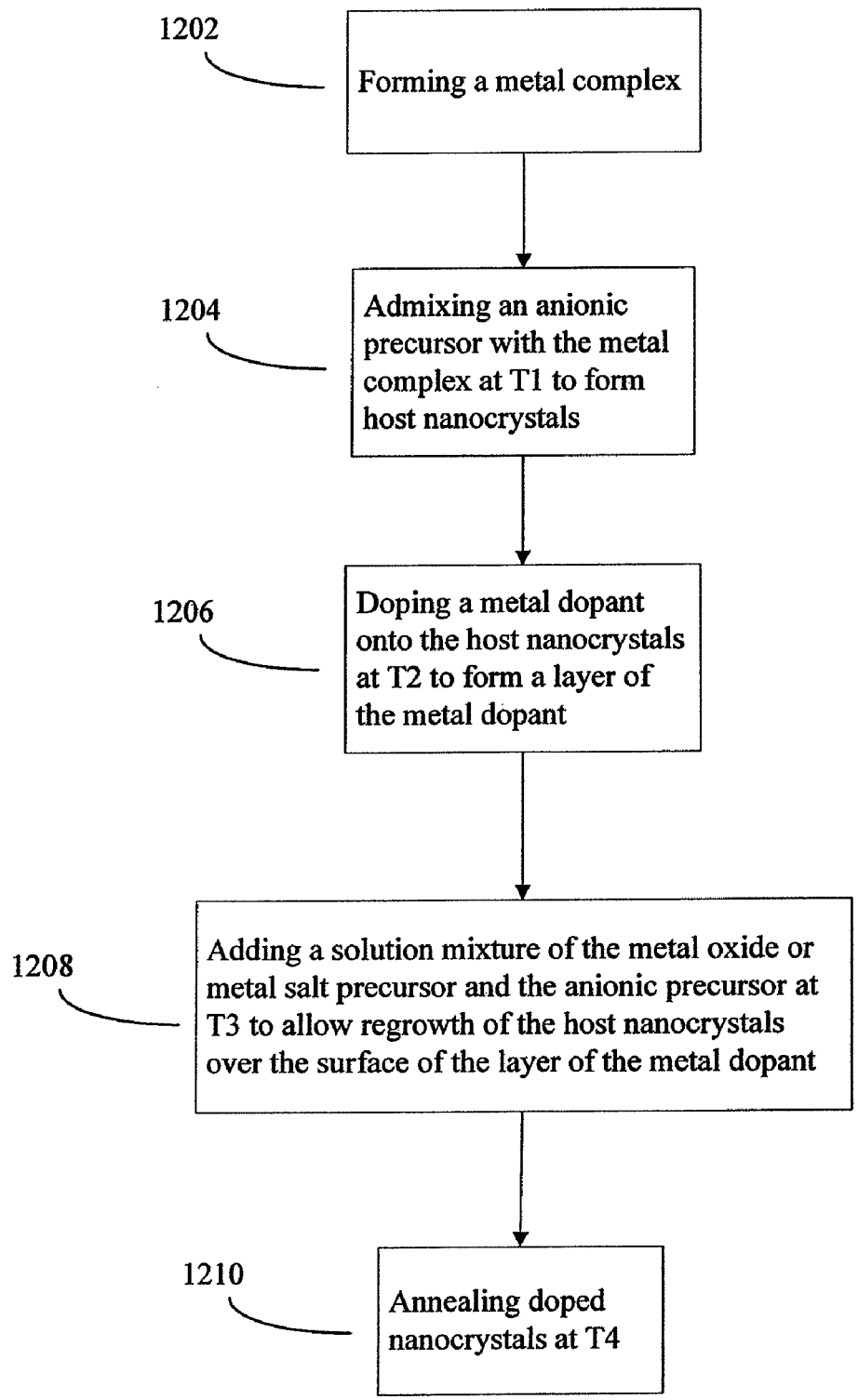
FIG. 12 schematically shows a process of making doped nanocrystals according to one embodiment of the present invention.

Thus, the present invention, in one aspect, relates to a method of synthesizing doped nanocrystals. In one embodiment as shown in FIG. 12, the method comprises the steps of combining a metal oxide or metal salt precursor, a ligand, and a solvent (coordinating or non-coordinating) to form a metal complex in a reaction vessel at step 1202; admixing a chalcogenic precursor with the metal complex at a first temperature, T1, sufficient to form a plurality of host nanocrystals at step 1204; doping a metal dopant onto the plurality of the host nanocrystals at a second temperature, T2, such that a layer with the metal dopant is formed substantially over the surface of a host nanocrystal that receives a metal dopant at step 1206; and adding a mixture having the chalcogenic precursor and the metal oxide or metal salt precursor at a third temperature, T3, into the reaction vessel to allow regrowth of host nanocrystals on the surface of the layer of the metal dopant formed substantially over the surface of a host nanocrystal that receives a metal dopant to form a plurality of doped nanocrystals at step 1208. The method further comprises the step 1210 of annealing the plurality of doped nanocrystals at a fourth temperature, T4. These steps can be carried out in a single reaction vessel.

The method further comprises a step of adjusting the concentration of the dopant in the doping layer by varying the ratio of the metal oxide or metal salt precursor and/or the non-metalic precursor to the metal dopant (not shown).

Figure 15:
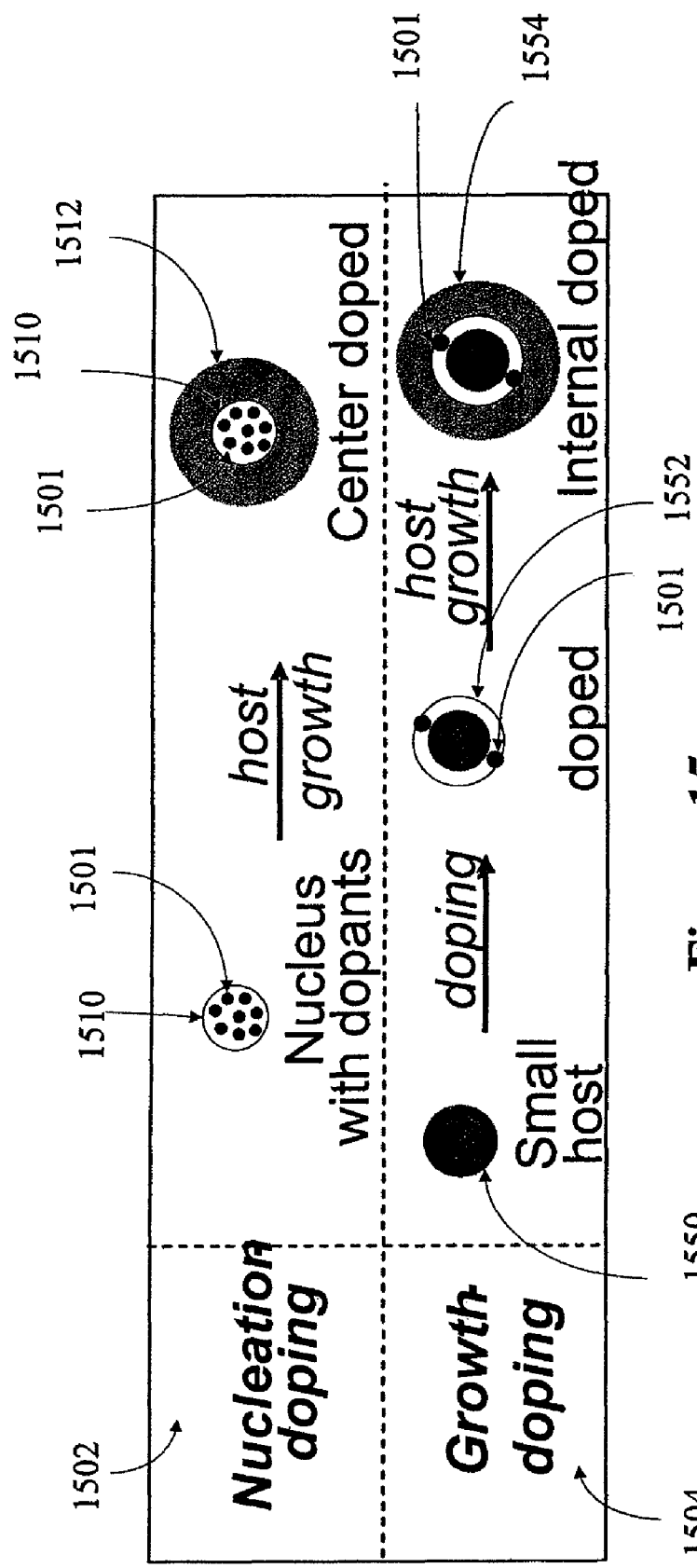
FIG. 15 schematically shows two processes of making doped nanocrystals according to various embodiments of the present invention: Top panel, making a core or nucleus doped nanocrystal (nucleation doping); and Bottom panel, making a shell doped nanocrystal (growth doping).

More generally, as shown in the bottom panel of FIG. 15, one aspect of the present invention relates to a shell or growth doping process 1504 of making doped nanocrystals, where a nucleus 1550 of host nanocrystal is formed first and a layer 1552 with one or more dopants 1501 is grown over the nucleus 1550. Then an additional layer of semiconductor material grows to form a doped nanocrystal 1554 where there is no dopant in the core as well as in the outer surface of the doped nanocrystal 1554.

The doped nanocrystal as produced according to the method of the present invention shows a characteristic of a semiconductor, which can be used as a biological labeling reagent, a light-emitting-diodes (LED), a solid state lighting device, a solar cell, an electronic device, a spintronic device.

The present invention, in another aspect, relates to a doped nanocrystal. In one embodiment as shown in FIG. 14(a), the doped nanocrystal 1410 has a core 1412 of a first semiconductor nanocrystal with an outer surface 1414, a layer 1416 with at least one dopant 1401 substantially enclosing the outer surface 1414 of the core 1412 of a first semiconductor nanocrystal, and a layer 1420 of a second semiconductor nanocrystal with an outer surface 1422 formed substantially over the layer 1416 with at least one dopant 1401. The layer 1416 with at least one dopant 1401 forms a shell substantially enclosing the outer surface of the core of a first semiconductor nanocrystal. Alternatively, the layer 1641 with at least one dopant 1401 may be formed just or at least partially over the outer surface of the core 1412. The at least one dopant 1401 can be a metal or non-metal dopant.

For such a typical shell doped nanocrystal as shown in FIG. 14(a), the core 1412 of a first semiconductor nanocrystal has a dimension d1 of from about 1 to 100 nm, the layer 1416 with at least one metal dopant 1401 has a thickness t1 of from about 1 to 100 nm, and the layer 1420 of a second semiconductor nanocrystal has a thickness t2 of from about 1 to 1000 nm.

Figure 13:
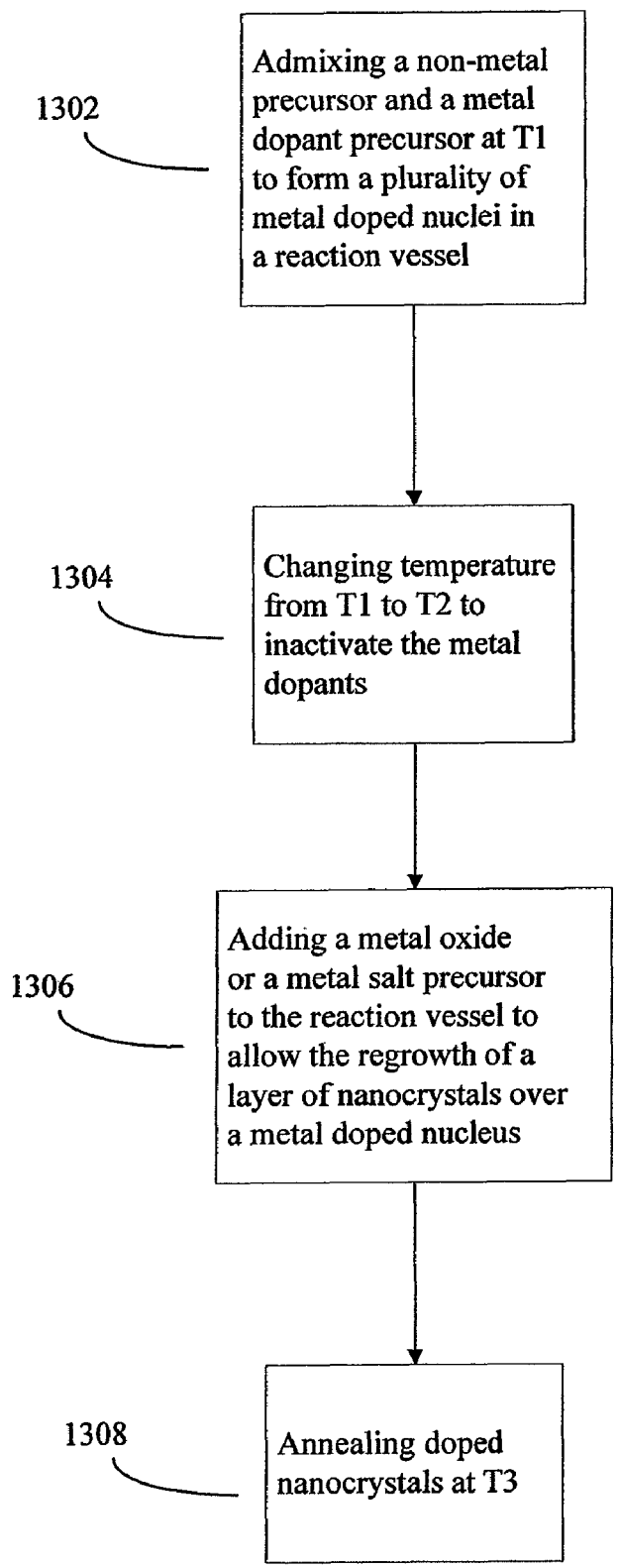
FIG. 13 schematically shows a process of making doped nanocrystals according to another embodiment of the present invention.

The present invention, in yet another aspect, relates to another method of synthesizing doped nanocrystals. In one embodiment as shown in FIG. 13, the method comprises the steps of admixing a non-metal precursor and a metal dopant in a solvent at a first temperature, T1, sufficient to form a plurality of host nanocrystal nuclei doped with the metal dopant in a reaction vessel at step 1302; changing the first temperature, T1, to a second temperature, T2, such that the remaining metal dopant, if any, becomes inactive chemically at step 1304; and adding a metal oxide or metal salt precursor to the reaction vessel to allow the growth of a layer of host nanocrystals over a host nanocrystal nucleus doped with the metal dopant so as to form a plurality of doped nanocrystals at step 1306, wherein some of them each has a nucleus doped with the metal dopant and a layer of host nanocrystals substantially enclosing the nucleus. The method further comprises the step of annealing the plurality of doped nanocrystals at a third temperature, T3 at step 1308. These steps are carried out in a single reaction vessel.

This method further comprises a step of adjusting the concentration of the dopant in a doped nucleus by varying the ratio of the metal oxide or metal salt precursor and/or the non-metal precursor to the metal dopant (not shown), wherein the concentration of the dopant in a doped nucleus is in the range of 0 to 100 atomic percent.

More generally, as shown in the top panel of FIG. 15, one aspect of the present invention relates to a nucleation doping process 1502 of making doped nanocrystals, where a nucleus 1510 of host nanocrystal is formed with one or more dopants 1501. Then the host nanocrystal grows to form a center doped nanocrystal 1512.

The doped nanocrystal as produced according to this method of the present invention shows a characteristic of a semiconductor, which can be used as a biological labeling reagent, a light-emitting-diodes (LED), a solid state lighting device, a solar cell, an electronic device, a spintronic device and the like.

Figure 14:
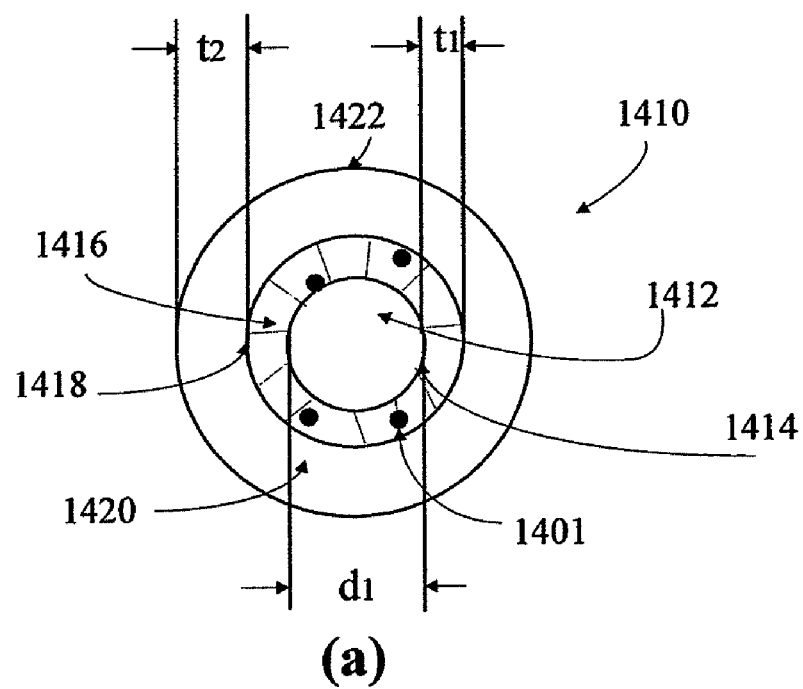
FIG. 14 schematically shows structures of a doped nanocrystal according to various embodiments of the present invention: (a) a shell doped nanocrystal; and (b) a core doped nanocrystal.
Figure 14:
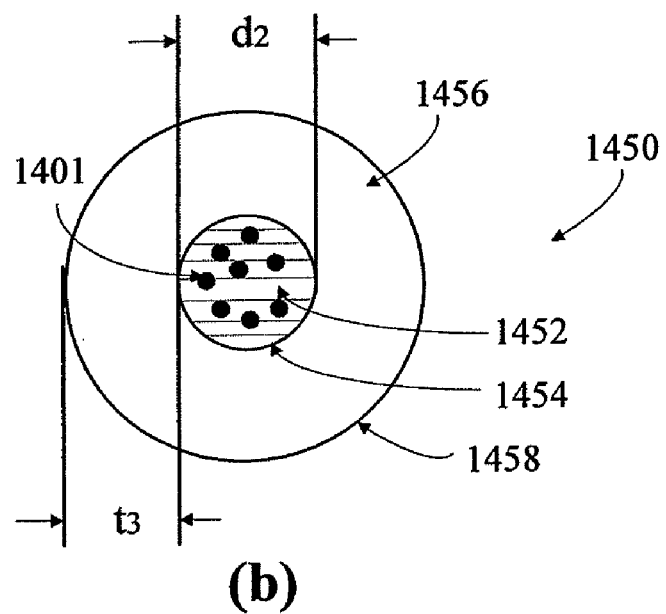

The present invention, in a further aspect, relates to a doped nanocrystal. In another embodiment as shown in FIG. 14(*b*), such a doped nanocrystal 1450 has a core 1452 of a first semiconductor nanocrystal with an outer surface 1454, wherein with at least one dopant 1401 is doped into the core 1452; and a thin layer 1456 of a second semiconductor with an outer surface 1458 substantially enclosing the outer surface 1454 of the core 1452 of a first semiconductor nanocrystal. In other embodiments, a layer of a second semiconductor may just be formed partially over the outer surface 1454 of the core 1452 of a first semiconductor nanocrystal. A third layer of a third semiconductor or additional layer(s) of additional semiconductor(s) can also be formed over the layer of a second semiconductor (not shown). The at least one dopant 1401 can be a metal or non-metal dopant.

As formed, the first semiconductor nanocrystal and the second semiconductor are different in this type of doped nanocrystals, wherein the core 1452 of a first semiconductor nanocrystal has a dimension d2 of from about 1 to 100 nm, and the layer 1456 of a second semiconductor nanocrystal has a thickness t3 of from about 1 to 1000 nm.

METHODS, EXAMPLES AND IMPLEMENTATIONS

Without intent to limit the scope of the invention, additional exemplary methods and their related results according to the embodiments of the present invention are given below. Note that titles or subtitles may be used in the examples for convenience of a reader, which in no way should limit the scope of the invention. Moreover, certain theories are proposed and disclosed herein; however, in no way they, whether they are right or wrong, should limit the scope of the invention so long as data are processed, sampled, converted, or the like according to the invention without regard for any particular theory or scheme of action.

Materials and Methods:
Chemicals:

Zinc stearate (ZnSt2), Zinc acetate, Octadecene (ODE), Tributyl phosphine (TBP) were purchased from Aldrich, Octadecylamine (99%) from Fluka and Copper acetate anhydrous from Alpha Aesar. Se and S powder were purchased from Aldrich.

Manganese stearate and manganese decanoate were prepared according to the method reported in literature [6].

TBPSe stock solution: TBPSe stock solution was prepared inside Glove-box with 1 mole Se in 1.6 moles of TBP.

Synthesis of ZnSe by Amine Injection:

6 gm ODE and 0.054 gm Zn(st)2 were loaded in a three necked flask, degassed and heated to 300° C. A separate solution of TBPSe (Zn:Se=1:5 to 1:30 moles), TBP (typically 0.5 ml to 1 ml) and ODA (Zn:ODA=~8 to 10) were prepared and injected to the above reaction mixture. The growth was carried out at different temperatures (260° C. to 300° C.) to get the desired size.

Synthesis of Cu Doped ZnSe:

In the above synthetic process, a desire size was chosen for Cu doping. Then the reaction mixture was cooled to 180° C. and a calculated amount of copper acetate in TBP was injected. The amount of copper is generally kept ~0.05 to 0.5% of the amount of Zinc. The reaction was constantly monitored at 180° C. or increased to 200-220° C. for copper doping. Generally copper reacts very fast with Se and hence the temperature is restricted below 240° C.

The above Cu-doped ZnSe NCs can further be shelled with ZnSe. Multi layers of ZnSe were grown by simultaneous injection of calculated amount of Zn-acetate or other zinc carboxylates, such as zinc stearate, and Se solution. The doping emission was red-shifted with the increased of the size of ZnSe nanocrystals. The first layer of ZnSe shell was grown at a relatively low temperature, which allowed the further inclusion of any remaining Cu precursor in this step. The remaining shelling process can be performed at much high temperature.

In a typical experiment, 8 gm ODE and 0.054 gm (8.5×10-5 moles) Zinc stearate (ZnSt2) were loaded in a 25 ml three necked flask, degassed by purging argon and heated to 300° C. A separate solution of 0.032 gm (5.1×10-4 moles) Se in 1.5 gm TBP and 0.1 gm (4.2×10-4 moles) of ODA was prepared in Glove-box and hot injected at 300° C. Heat was removed and the reaction mixture was cooled to below 180° C. to restrict the growth of ZnSe nanocrystals. At this temperature, a solution of 6.2×10-5 gm (3.41×10-7 moles) copper acetate (anhydrous) in 0.1 gm TBP was injected and the reaction was monitored by UV-vis and PL spectra with taking samples at different time intervals. Sometimes the reaction temperature is increased to 200° C. or 220° C. to enhance the copper insertion inside the ZnSe nanocrystals.

To have further shelling with ZnSe, Zinc-acetate in TBP was injected at below 200° C. and the temperature was increased to 240° C. for annealing.

Synthesis of Mn Doped ZnSe:

For Mn doped ZnSe, a desire core size was chosen and a solution of Manganese decanoate and Zinc stearate in ODE was injected. The reaction temperature was carried out between 260-280° C. This helps a simultaneous precipitation of ZnSe and MnSe on ZnSe cores. Within an hour of the reaction, the emission of the sample was dominated by Mn-doping emission in addition to a small amount of ZnSe exciton emission.

Synthesis of MnSe:

0.025 gm Mn (St)2 in 12 gm ODE was loaded in a 50 ml three necked flask, degassed and heated to 290° C. A separate solution of TBPSe and ODA was prepared (Mn:Se:ODA=1:30:12) and injection to the above reaction mixture at 290° C. The reaction was allowed to continue at that temperature until no growth of MnSe can be evidenced by UV-Vis measurements. When the Mn:Se ratio was relatively low, such as Mn:Se=1:8, the reaction mixture slowly turned yellow indicating small size of MnSe Nanocrystals. In a four and half hours reaction, about 4 nm of MnSe Nanocrystals was observed.

Synthesis of Core Doped Mn/ZnSe:

The above synthesis of MnSe was repeated but the reaction mixture was cooled to 180° C. after an hour and calculated amount of Zinc acetate solution in TBP was injected. As Se remains excess in the solution, ZnSe starts growing on preformed MnSe. The growth process was continued till it reached a desired size. Finally the temperature was again increased to 240° C. for annealing. In this process, no ZnSe exciton emission along with Mn-doping emission was observed. But if the injection of Zinc acetate is carried out at above 240° C., the ZnSe exciton emission is observed because of formation of free ZnSe NCs at higher temperature. When the Mn:Se ratio was high, such as Mn:Se=1:30, it was not necessary to wait for a hour before the growth of ZnSe shell. For this case, the growth of ZnSe shell was able to be carried out under high temperatures, as high as the boiling point of the solvent system.

In a typical experiment, 0.015 gm (2.42×10-5 moles) manganese stearate (MnSt2) and 13 gm ODE were loaded in a 50 ml three necked flask, degassed by purging argon and heated to 290° C. MnSt2 started dissolving nearly 100° C. and the solution turned little dark but became clear at above 250° C. A solution of 0.3 gm TBP, 0.015 gm (2×10-4 moles) Se powder and 0.08 gm (2.5×10-4 moles) ODA were prepared in Glove-box and hot injected to the above reaction mixture at 290° C. The color of the resulting solution slightly turned yellowish but it intensified with the progress of the reaction. After 60 min at 280° C., the reaction mixture was cooled to 250° C. and a solution of 0.008 gm (1.2×10-5 moles) ZnSt2 in 1 gm ODE was hot injected. The reaction was monitored at that temperature until the emission peak ~580 nm came out. Then the temperature was reduced to 180° C. and 0.022 gm (1.2×10-4 moles) zinc acetate in 2 ml TBP was injected in thee phases each with 30 minutes duration. Finally the reaction temperature was increased to 240° C. for at least 30 minutes for annealing.

Results and Discussion:

1. Shell-doped Nanocrystals: Cu and Mn Doped ZnSe Nanocrystals

Soft reactivity of copper makes it easier to insert inside the host lattice of either ZnS or ZnSe. Instantaneous reaction of copper acetate and TBPSe even at below 200° C. to form black CuSe particles makes little difficult to use it as dopant in the system of the current invention. Moreover, presence of amine may lead to form complex with Cu2+ and it might prevent formation of CuSe at below 200° C. Interestingly, copper, at low concentration, can easily incorporate into ZnSe crystal lattice through reaction between 180 to 220° C. As shown in FIG. 1a, the time dependent luminescence and insertion of Cu into perform ZnSe nanocrystals. Two methods for Cu doping were selected. One was fixed size of cores and insertion of Cu into their crystal lattice through annealing, and the second one was to put new layers of ZnSe on ZnSe cores to trap Cu atoms (or CuSe) inside. In former case, the exciton emission of ZnSe was not completely vanished but in later case it became flat and only the doping emission remained. As shown in FIG. 1b, further growth of ZnSe on Cu:ZnSe cores. Increase of the size of ZnSe NCs red-shifts the doing emission from about 450 nm to 550 nm. This way, doping can be done at any size of the cores and once the Cu doping emission is evaluated, it can be further shelled with ZnSe or ZnS, or both. The absorbance positions remain similar to undoped ZnSe NCs. FWHM of this Cu-doped ZnSe NCs generally remains ~60 to 80 nm. Photoluminescence quantum yield falls around 5 to 8% at room temperature. Further coating of ZnS layers onto the cu-doped ZnSe nanocrystals increased the PL brightness and stability.

Figure 2:
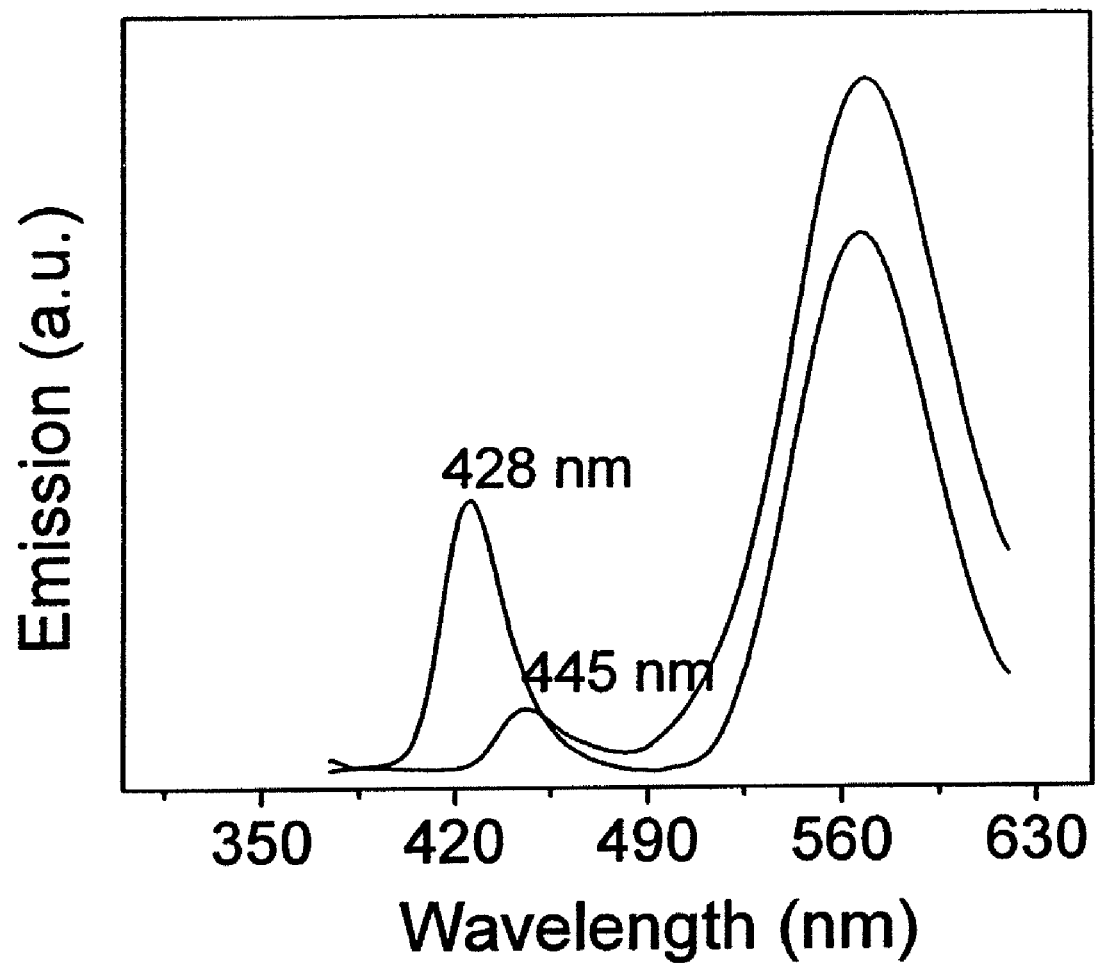
FIG. 2 shows a spectropic graph of Mn2+ doping simultaneous with the growth of ZnSe NCs.

Hence a smaller analog of manganese carboxylate, manganese decanoate, was chosen along with zinc stearate. To a fixed size of ZnSe cores, manganese decanoate and zinc stearate were simultaneous precipitated on core ZnSe hosts. These Mn:ZnSe NCs also have some excitonic emission along with doing emission. Increase of Mn ions and size of ZnSe NCs were monitored through photoluminescence emission as former increases the intensity of doping related emission and later red-shifts the exciton emission as shown in FIG. 2.

Figure 3:
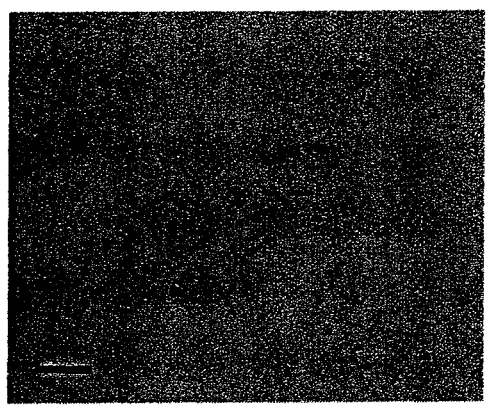
FIG. 3 shows (a) TEM image of MnSe (bar=60 nm); and (b) Successive UV-visible spectra during the formation of MnSe at 10, 30 and 180 minutes.
Figure 3:
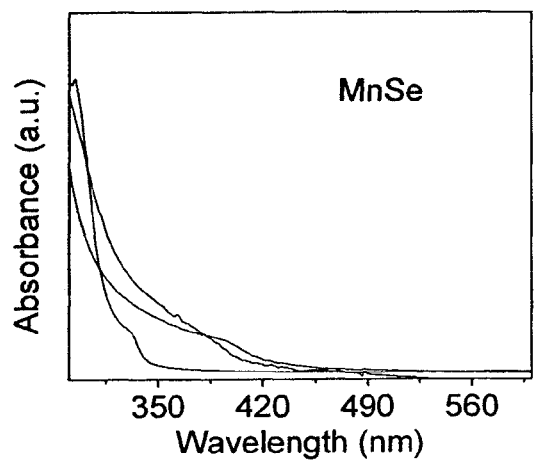

2. Core-doped Nanocrystals: Mn:ZnSe or MnSe:ZnSe Doped Nanocrystals 2.1 Formation of MnSe:

Amine catalyzed thermal decomposition of various transition metal carboxylates, results high quality metal oxide (NCs) [6]. However, to use these metal carboxylates as precursors for synthesis of non-oxide II-IV semiconductors, presence of alkyl amine without the existence of the targeted non-metal precursor should be avoided. Hence, to prevent the formation of metal oxides, amine injection along with the targeted anionic precursor (e.g. Se precursor) at high temperature was a preferable option [7]. Manganese-streate (MnSt2) is stable in octadecene (ODE) till 300° C. and self decomposes to MnO at above this temperature. Amine was injected along with excess selenium precursor just below 300° C. to facilitate MnSe rather than MnO. Injection of TBPSe slowly led to yellow appearance of the reaction mixture which indicates the formation of MnSe clusters or their nanocrystals. As shown in FIG. 3a, TEM image of one MnSe nanocrystal sample is given. However the electron diffraction (ED) of either samples did not encourage much regarding their crystallinity, especially for small ones. For large ones, only few places the diffraction rings could be seen but surprisingly these matched with α-MnSe. XRD did not show any peak from the purified sample. FIG. 3b shows the successive UV-visible spectra during the formation of MnSe. MnSe can occur in two different structures, metastable sphalerite as well as rock salt structure [8,9]. The metastable phase of MnSe changes its crystal structure at high temperature. A large excess of Se, e.g. Mn:Se=1:30, would consume all Mn precursor within a few minutes and obtain very small clusters of MnSe. These clusters are substantially easier to be applied for the growth of the doped nanocrystals because of their small size, negiligible Mn precursor residual, and short reaction time.

Figure 4:
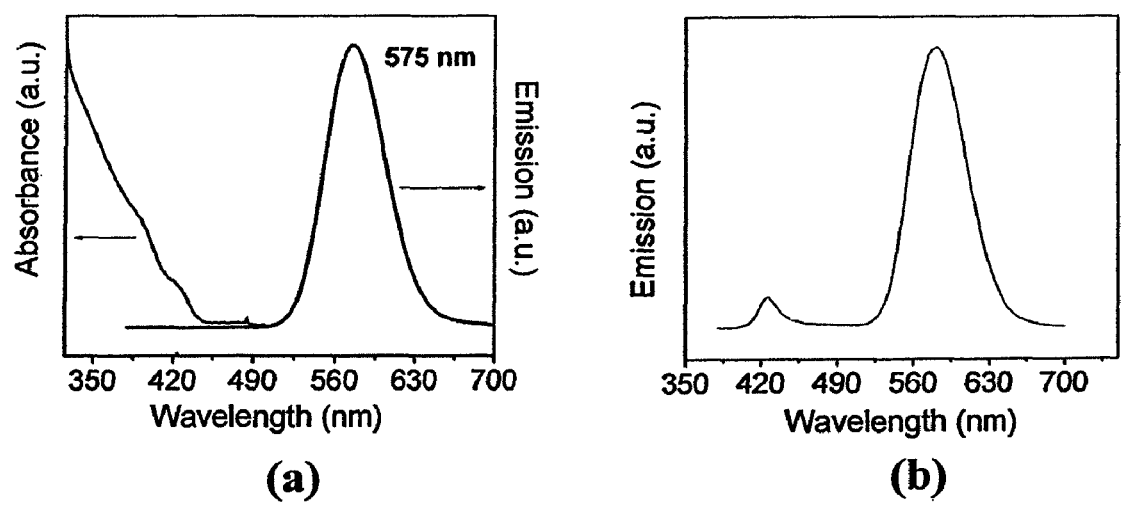
FIG. 4 shows (a) Typical UV-visible and PL spectra of high-quality MnSe/ZnSe NCs; and (b) Injection of Zn(OAc)2 at 240° C. Excitation wavelength=325 nm.

2.2 Zn Precursors and their Injection Temperatures:

Zinc carboxylates are chosen for Zn precursor because of their stability, low toxicity, and low cost. Addition of zinc carboxylate (any chain length) to the above solution of MnSe immediately results the doping emission which is believed to be due to Mn centers inside ZnSe crystal lattices. ZnSt2 at above 250° C. forms ZnSe exciton emission along with the doping emission if a relatively high amine concentration was used, and can only be used for the case a large excess of Se precursor was used for the formation of MnSe nanoclusters and the amine concentration would be relaively low. At below 240° C., it shows poor reactivity and hence zinc acetate, Zn (OAc)2 behaves very differently. Due to high reactivity, it also forms ZnSe exciton emission along with the doping emission at above 220° C. Hence for Zn (OAc)2, 180 to 220° C. temperature was optimized for better emission. Zn (OAc)2 was phase wise injected at 180° C. and each time the temperature was increased to 220° C. for annealing. FIG. 4 shows a typical UV-visible and PL spectra for such MnSe/ZnSe system. This process is called thermal cycling. This way, the inventors could not see any exciton emission or the surface related emission for ZnSe. However, for high temperature injection (>240° C.), always a hump of exciton emission peak remained (as shown in FIG. 4) if the Mn:Se ratio in the first step was not sufficiently high and a large excess of amine was in place.

Figure 5:
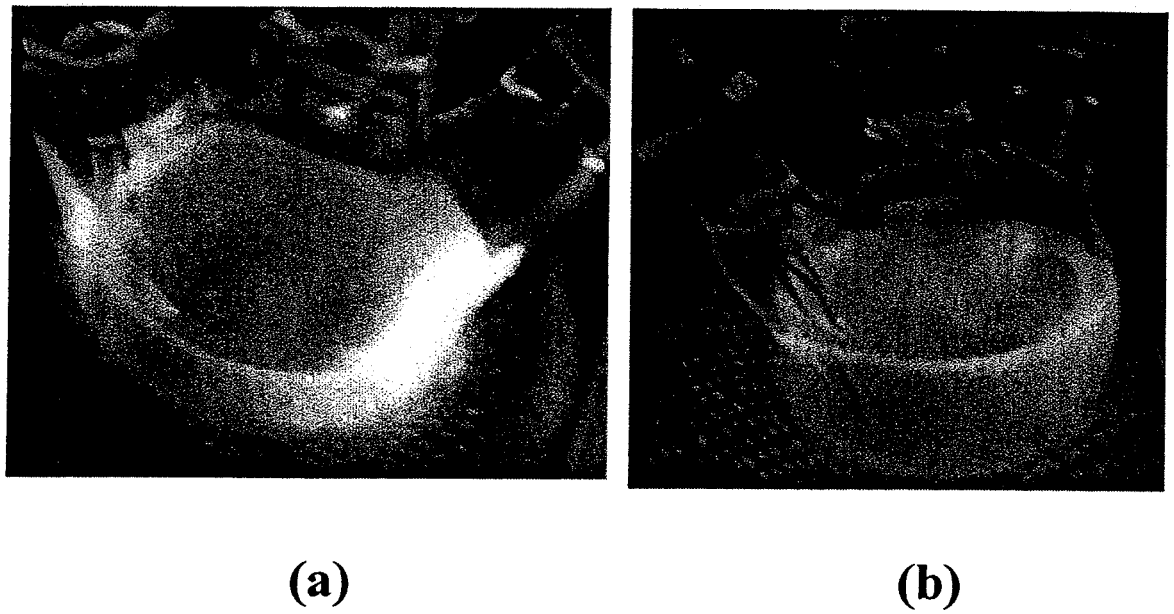
FIG. 5 shows (a) Reaction container at 180° C.; and (b) Reaction container at 220° C. under UV light.

FIG. 5 shows the pictures of the reaction pot at 200° C. and 220° C. under UV-light. Bright emission colors are evidenced. Exceptional thermal stability of the dopant emission up to 300° C. (close to the boiling point of the solvent) has been observed.

Figure 6:
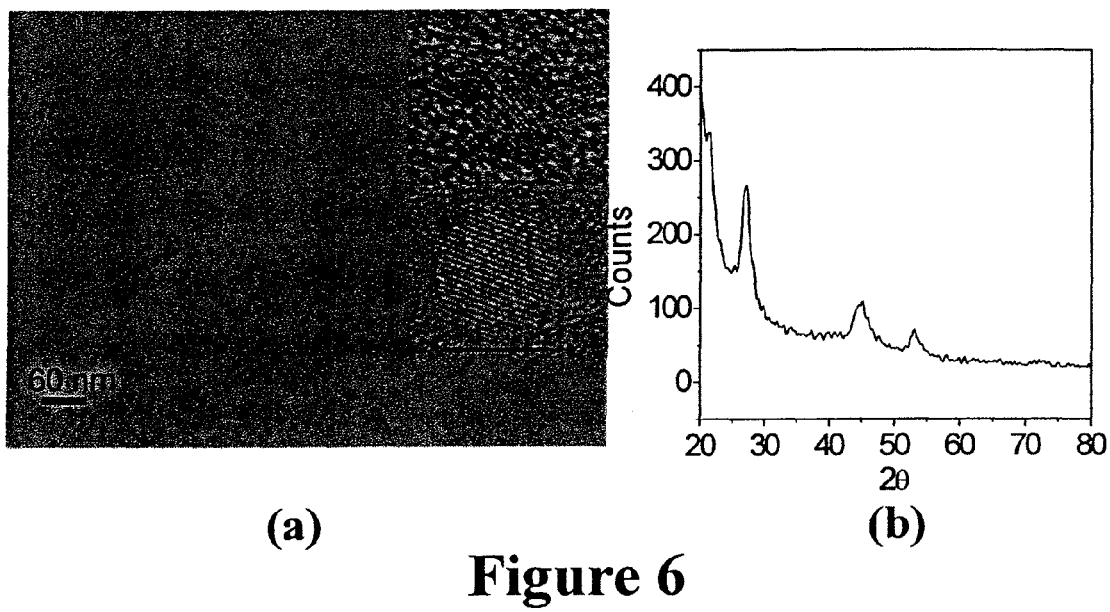
FIG. 6 shows: (a) TEM images of ~6 nm MnSe/ZnSe NCs. Inserted HRTEM bars=5 nm. (b) right, XRD pattern for MnSe/ZnSe.

With an approximate calculation from 4 nm core of MnSe and 2 nm shell of ZnSe, which were confirmed by TEMs, the photoluminescence quantum yield (QE) remained 8 to 12% when the Zn injection was carried out at 180° C. However, with drop-wise injection at 220° C. and annealing at 240° C., it showed 12 to 16% QE. This indicates that the quality of the NCs in terms of the emission yield depends on the temperature of annealing. In this situation, the inventors have tried to improve the emission by taking the minimum amount of either zinc oleate or ZnSt2 and injecting at high temperature. One aim was to create a ZnSe boundary surrounding MnSe cores, which would result in a thin layer. Dropwise injection of dilute solution prevented the formation of new nucleation. Once the solution gave the orange emission, the temperature was cooled to 180-200° C. and Zn (OAc)2 was injected. The FWHM of these PL spectra remained ~50 nm and the QE increased up to 27-30%. FIG. 6 shows TEM and HRTEM images of ~6 nm MnSe/ZnSe NCs.

It should be pointed out that, QE as high as 50% was observed when a large excess of Mn:Se ratio was used, which allowed the shelling of ZnSe layer using Zn(St)2 as the precursor at a high reaction temperature, as high as the boiling point of the solvent system.

Figure 7:
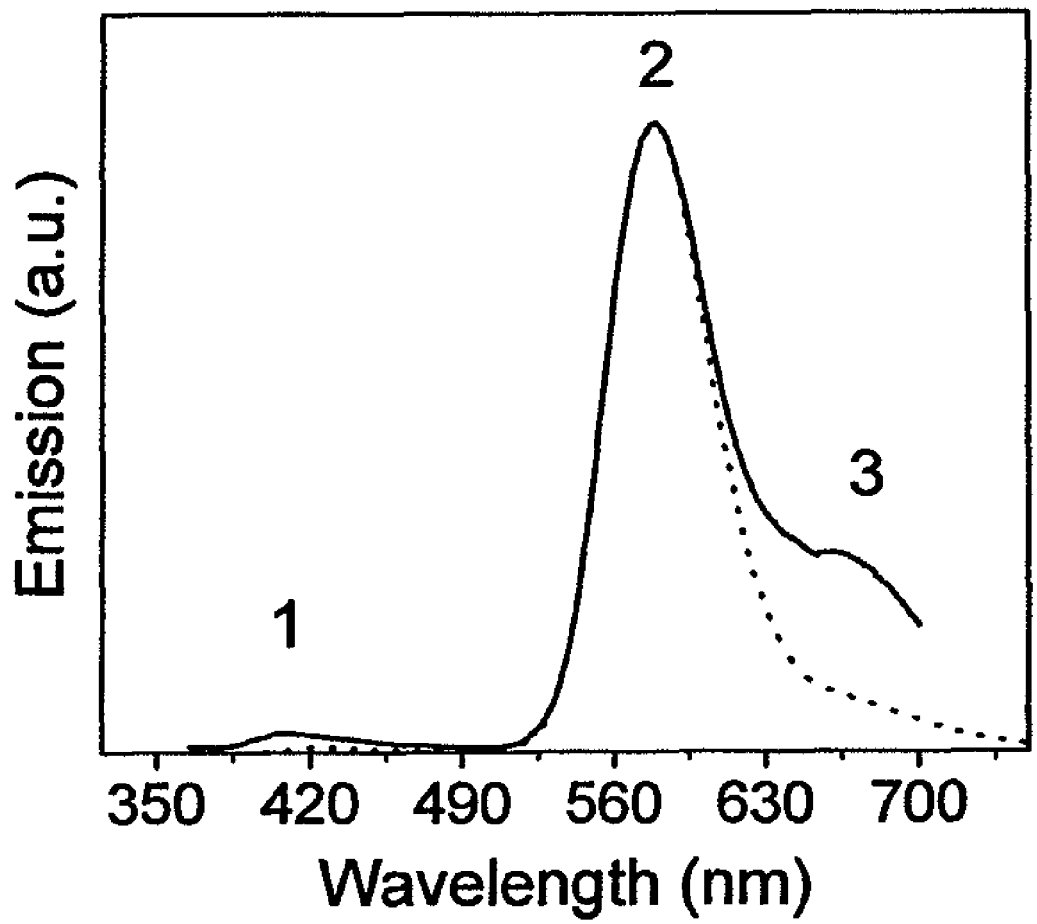
FIG. 7 shows PL spectra of MnSe/ZnSe at 160° C. injection of Zn(OAc)2. The dotted line corresponds to 240° C. annealing of the same sample. Excitation wavelength=325 nm.

Injection of Zn (OAc)2 at lower than 180° C., not only reduced the emission intensity but also generated a new broad emission ~600 nm. FIG. 7 shows three emission peaks: peak 1 is due to the exciton emission, peak 2 is Mn related emission and peak 3 is an additional peak which generally forms at low temperature or with less amount of amines. This third and broad emission is usually found for bulk Mn:ZnSe and it is assigned to self-activated luminescence, which was earlier reported by Suyver et. al. [3] and is generally formed due to defect states. However, with rise of temperature and in presence of excess of amines, this peak is eliminated.

2.3 Emission Intensity and the Core Size of MnSe:

The growth of ZnSe on different size cores of MnSe was performed. The emission intensity of 2 nm shell of ZnSe on 2 nm and 4 nm size MnSe remained nearly same. But with 4 nm and 2 nm shell on 2 nm and 4 nm MnSe cores showed large difference in intensities. Increase of ZnSe thickness on MnSe increased the emission. For doped NCs, the 4T2→6A 1 Mn2+ emission intensity should increase with increase of Mn2+ ions [2] though in some cases quenching of such emission is observed with high Mn concentration [10,11]. In the present invention, the inventors could see the emission at any proportion of Zn and Mn though with higher amount of Zn or larger the thickness of the shell made it more intense. The inventors observed 10 to 30% Mn (compared to the sum of Mn and Zn) and it depended on the thickness of ZnSe layers. As the emission at about 580 nm is typical for 4T2→6A1 Mn2+ doped in ZnSe NCs, the inventors think their system might be as simple as Mn doped ZnSe NCs. So far the best quality Mn:ZnSe NCs has been reported, Mn ions replace the Zinc ions from cubic binding sites and responsible for the emission [3,4]. Presence of up to 30% Mn in the present invention's ZnSe system may lead to a different mechanism, and is of importance for spintranics. Recently, Bawendi's group has reported the accumulation of Mn ions to the surface of CdSe during high temperature annealing. So annealing should reduce the presence of Mn inside the ZnSe cores i.e. lowering the dopant concentration which should reduce the emission intensity. In the present invention, even annealing at ~220-240° C. for seven hours, the inventors could not see any drop of the emission and instead it helped to increase the QE hopefully helping to make a perfect crystal (bulk lattice mismatch=4.2% for MnSe and ZnSe). In principle, this invention allows completely removal of surface doping, which has also been proven by the exceptionally high stability against thermal (discussed above) and environmental changes (see below).

Figure 8:
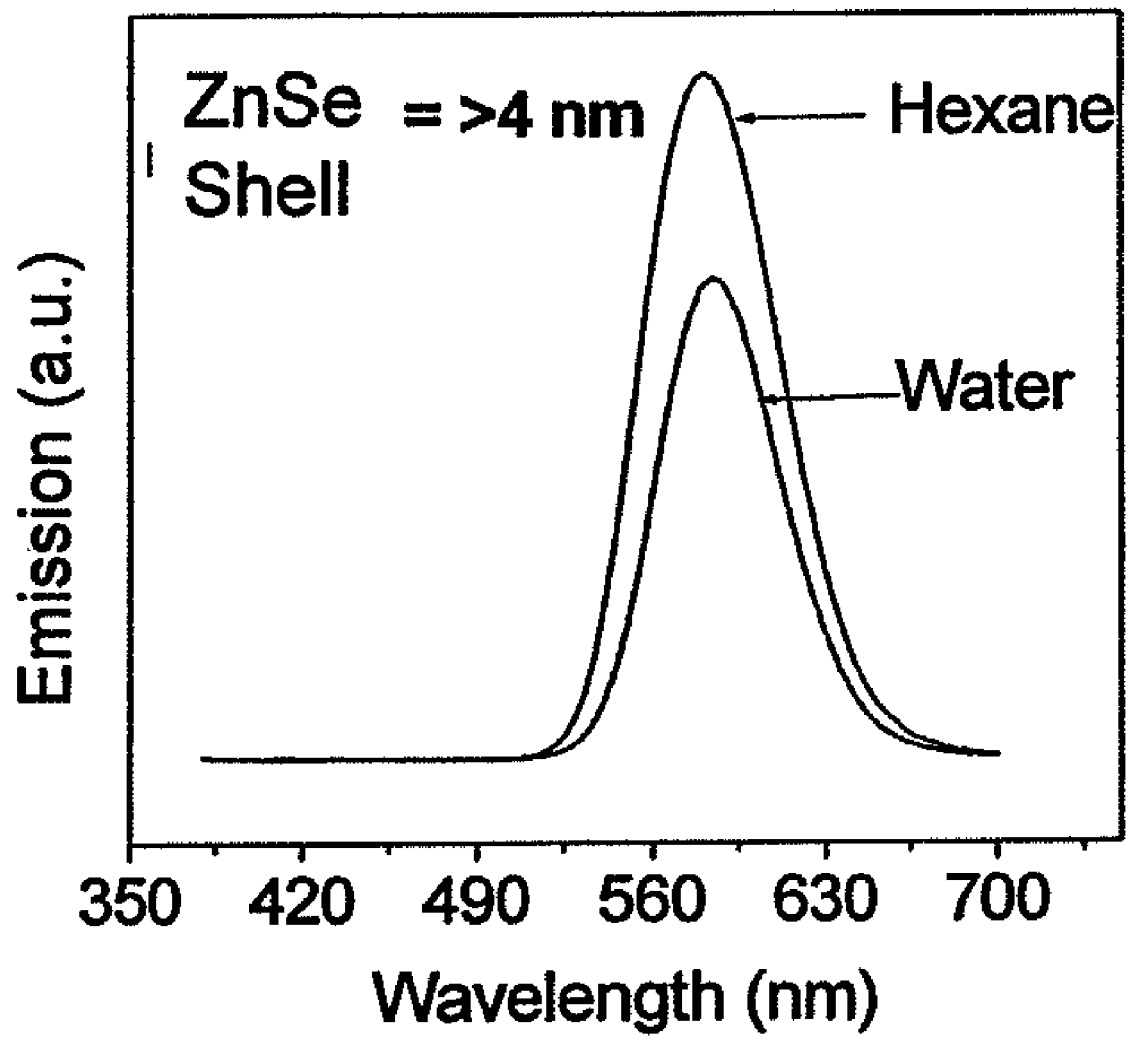
FIG. 8 shows ODA capped MnSe/ZnSe NCs in hexane and the ligand exchanged by MPA. Insert is a carton, shows the thickness of ZnSe is greater than 4 nm. Thickness is estimated by judging the UV-visible spectra and also the amount of Zn compared to Mn in the solution. Excitation wavelength=325 nm.

2.4 Purification and Ligand Exchange:

ODA capped MnSe/ZnSe NCs were purified from ODE using methanol and hexane according to the method reported else where. Long standing of the NCs either in hexane or toluene precipitated the unreacted metal stearates and then the solution was centrifuged to get pure NCs. These were further precipitated from hexane solution with methanol to remove excess amines. These purified and precipitated NCs were ligand exchanged by mercaptopropionic acid (MPA) according to the method reported by Aldana et al.[1,2]. Interestingly the NCs having a thick shell (>3 nm) of ZnSe shell grown with a relatively low Mn:Se ratio (1:8) retains above 60% of the quantum efficiency, as shown in FIG. 8, though a thin shell loses most of it.

If the Mn:Se ratio is high (e.g. 1:30) and the growth of ZnSe shell is at relatively high temperatures (about above 250° C.), the PL of the doped nanocrystals responds in a quite different fashion. For thin ZnSe shell, it losses some of the brightness, an intermediate shell thickness actually receives some increase of the brightness, and the brightness remains more or less the same for the doped nanocrystals with a thick shell. The quantum yield of these water-soluble doped nanocrystals can thus be as high as 50%.

This indicates that these doped nanocrystals can be manipulated as regular core/shell nanocrystals in terms of ligands chemistry. In terms of PL properties against thiol ligand exchange, doped nanocrystals are sufficiently better than the traditional core nanocrystals and at least comparable to the best quality core/shell nanocrystals.

Nanocrystals, not limited to doped nanocrystals, can be coated with dendron-ligands and dendron-boxes [13,14]. By chemically inserting a conductive component into a dendron ligand, asymmetric dendrons, one can make the nanocrystals electronically communicate with the environment outside the ligand monolayer. The present invention will make the doped nanocrystals, as well as other nanocrystals, to be much more useful for many applications, such as LEDs, sensing, catalysis, electronics, solid state lighting, and energy conversion. For which charge transport and electronic communication between the nanocrystal and the environment is critically important.

Figure 9:
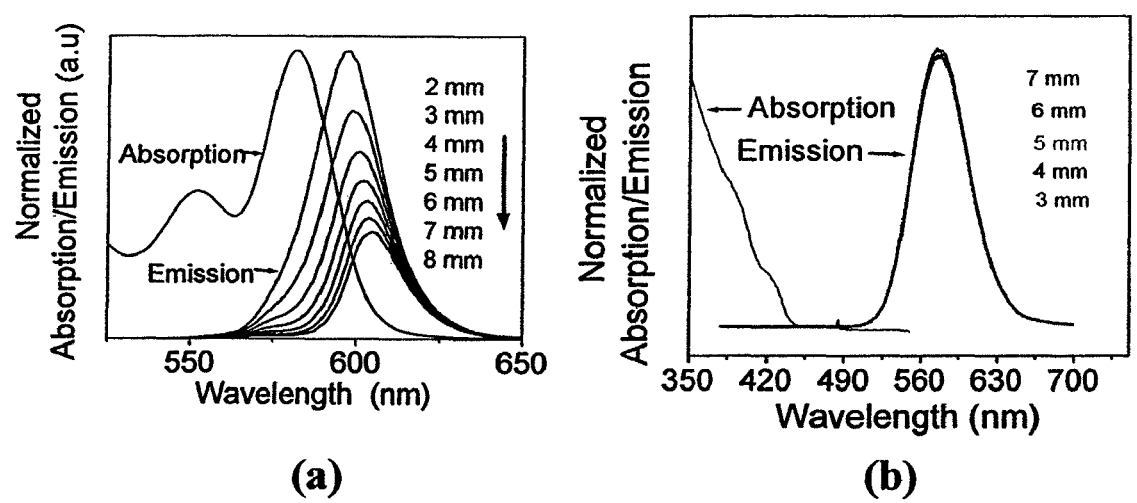
FIG. 9 shows spectropic graphs of (a) UV-visible and PL spectra of CdSe; and (b) MnSe/ZnSe with change of pathlengths. Excitation wavelength=325 nm for MnSe/ZnSe and 400 nm for CdSe.

2.5 Self-quenching Through Reabsorption and Energy Transfer:

As the absorption and the emission wavelengths of doped nanocrystals do not overlap, these NCs do not show any reabsorption at higher concentration. The fluorescence measurements were carried out in a special setup for the translational movement of the cuvette. A micrometer translation stage was fixed to the cuvette holder along the axis of emission so that fluorescence could be measured for emission path lengths from approximately 2-8 mm (roughly the length of the cuvette). The fluorescence emission peaks for varying emission path lengths are shown in FIG. 9. The optical density was 4.5 at 325 nm. For a comparison, the reabsorption of CdSe NCs with optical density 3.4 at the band-edge absorption peak (590 nm) was studied as shown in FIG. 9. As the emission path length was varied from approximately 1 to 9 mm, reabsorption became stronger leading to reduction of the overall fluorescence intensity as well as a red-shift in the emission peak position. It can be understood as there is no overlap between the absorption and emission spectra for any doped NCs, reabsorption should not be expected. For the same reason, resonance energy transfer between doped nanocrystals would not occur either.

Figure 10:
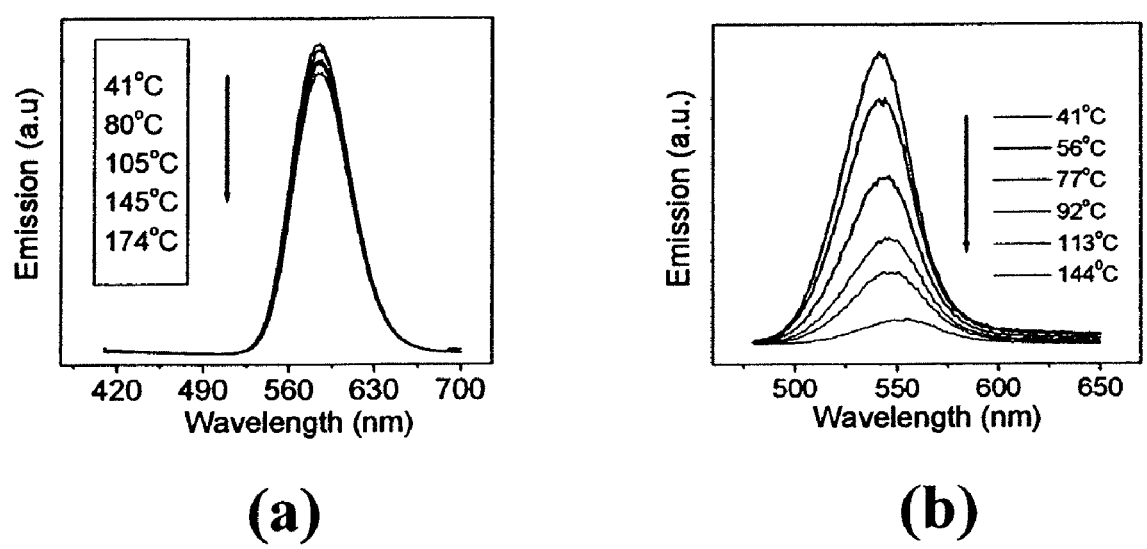
FIG. 10 shows spectropic graphs of PL spectra with temperature: (a) ODA capped MnSe/ZnSe dissolved in ODE; and (b) Right: ODA capped CdSe dissolved in ODE. Excitation wavelength=325 nm for MnSe/ZnSe and 400 nm for CdSe.
Figure 11:
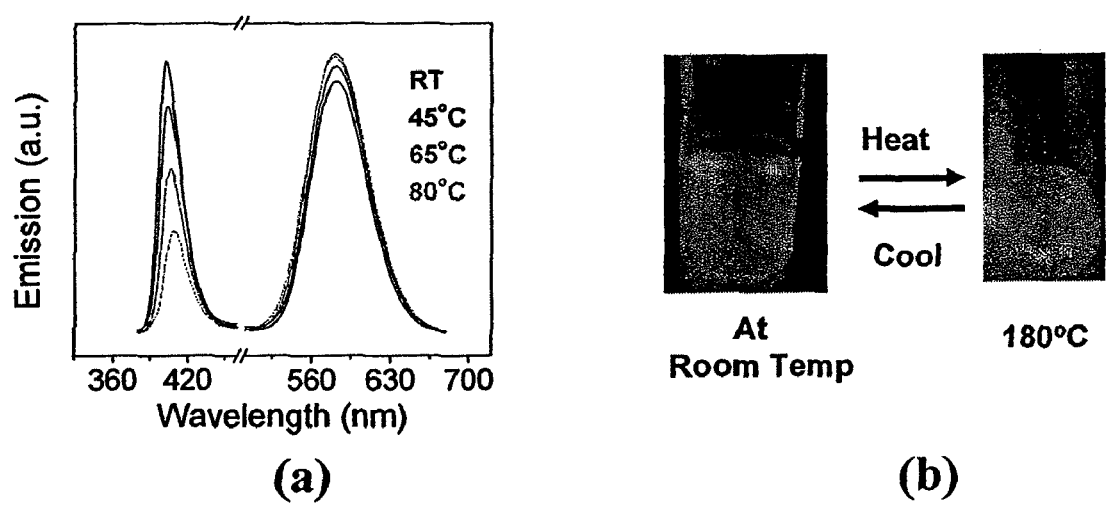
FIG. 11 shows: (a) Change of PL spectra; and (b) Color of the solution of a mixture of ZnSe and MnSe/ZnSe NCs with temperature. Excitation wavelength=325 nm.

2.6 Temperature Effect:

Either purified or the crude MnSe/ZnSe NCs were dissolved in ODE, degassed by purging argon and heated. Photoluminescence spectra were recorded at different temperatures s shown in FIG. 10. No emission drop was noticed till 200° C. However, above 250° C., one could see some irreversible dropping of the emission and it might be due to the ligand mobility at high temperature. The crude NCs directly taken from the reaction pot did not show any emission drop till 240° C. Addition of more free ligands (ODA) helped to stabilize the emission. Additional improvement was observed when the ZnSe shell was grown under relatively high temperatures with a high Se to Mn ratio for the growth of the doped core, which allowed the nanocrystals to be thermally stable even the solvent was boiling. The irreversible emission drop can be considered due to the loss of ligands from the surface of the NCs. To verify the observation, the same experiment with CdSe NCs was repeated. But it lost almost complete emission just around 150° C. However, the loss of emission occurred at rather low temperature, below 70° C. Below 150° C. is reversible and it restores on cooling. When the temperature crossed 250° C., it again behaved similar to the MnSe/ZnSe NCs with irreversible emission, which relates to the mobility of the ligands on the surface of the NCs. ZnSe exciton emission followed similar to CdSe. In a typical experiment, pure ZnSe NCs (blue emission) and MnSe/ZnSe NCs (orange-yellow emission) were intentionally mixed and heated. The resultant purple color which was a mixture of blue and yellow-orange lost the blue emission at above 150° C. but returned at room temperature. FIG. 11 shows the reversible change of the ZnSe exciton emission and no change of the MnSe/ZnSe emission.

While there has been shown several and alternate embodiments of the present invention, it is to be understood that certain changes can be made as would be known to one skilled in the art without departing from the underlying scope of the invention as is discussed and set forth above and below including claims. Furthermore, the embodiments described above and claims set forth below are only intended to illustrate the principles of the present invention and are not intended to limit the scope of the invention to the disclosed elements.

LIST OF REFERENCES

[1]. C. C. Klick and J. H. Schulman, *Solid St. Phys.*, 1957, 5, 97-102.

[2]. T. J. Norman, D. Magana, T. Wilson, C. Burns, J. Z. Zhang, D. Cao and F. Bridges, *J. Phys. Chem. B.*, 2003, 107, 6309-6317.

[3]. J. F. Suyver, S. F. Wuister, J. J. Kelly and A. Meijerink, *Phys. Chem. Chem. Phys.* 2000, 2, 5445-5448.

[4]. D. J. Norris, Y. Nan, F. T. Charnock and T. A. Kennedy, *Nano Lett.* 2001, 1, 3-7.

[5]. M. Godlewski, W. E. Lamb and B. C. Cavenett, *Solid St. Commun,* 1981, 39, 595-599

[6]. N. R. Jana, Y. Chen and X. Peng, *Chem. Mater.;* 2004, 16, 3931-3935.

[7]. Li, L. S.; Pradhan, N.; Wang, Y.; Peng, X.; *Nano Lett.;* 2004; 4(11); 2261-2264.

[8]. D. Litvinov, D. Gerthsen, A. Rosenauer, B. Daniel and M. Hetterich, *Appl. Phys. Lett.* 2004, 85, 751.

[9]. A. Pajaczkowska, *Prog. Cryst. Growth Charact.* 1978, 1, 289.

[10]. Borse, P. H.; Srinivas, D.; Shinde, R. F.; Date, S. K.; Vogel, W.; Kulkarni, S. K. *Phys. Rev. B* 1999, 60, 8659-8664.

[11]. Khosravi, A. A.; Kundu, M.; Kuruvilla, B. A.; Shekhawat, G. S.; Gupta, R. P.; Sharma, A. K.; Vyas, P. D.; Kulkarni, S. K. *Appl. Phys. Lett.* 1995, 67, 2506-2508.

[12]. Aldana, J.; Lavelle, N.; Wang, Y.; Peng, X.; *J. Am. Chem. Soc.;* 2005; 127(8); 2496-2504.

[13]. W. Guo, J. Li, Y. A. Wang, X. Peng, *J. Am. Chem. Soc.,* 2003, vol 125, p 3901.

[14]. Wang, Y. A., Li, J. J., Chen, H., Peng X. *J. Am. Chem. Soc.,* 2002, vol 124, p 2293.

What is claimed is:

1. A composition comprising a plurality of doped semiconductor nanocrystals, the doped semiconductor nanocrystals comprising a core comprising at least one dopant and a shell substantially surrounding the core, wherein the doped semiconductor nanocrystals are free of surface doping and have a stable dopant emission at a temperature ranging from about 41° C. to about 174° C., the dopant emission accounting for greater than 99% of photoluminescence from the nanocrystals.

2. The composition of claim 1, wherein the core comprises, a metal and a non-metal.

3. The composition of claim 2, wherein the non-metal comprises an element selected from Group V, VI or VII of the Periodic Table.

4. The composition of claim 2, wherein the non-metal comprises Se, O, P or S.

5. The composition of claim 2, wherein the metal comprises an element of Group I, II, III or IV of the Periodic Table or a transition metal.

6. The composition of claim 2, wherein the metal is selected from the group consisting of Zn, GA, and In.

7. The composition of claim 1, wherein the dopant comprises a metal or a non-metal.

8. The composition of claim 7, wherein the metal is a transition metal or rare earth metal.

9. The composition of claim 8, wherein the transition metal is Cu, Ag, Fe, Cr or Mn.

10. The composition of claim 1, wherein the dopant is present in the core in an amount up to 30%.

11. The composition of claim 2, wherein the shell comprises a semiconductor material.

12. The composition of claim 1, wherein the doped semiconductor nanocrystals further comprise ligands on surfaces of the doped semiconductor nanocrystals.

13. The composition of claim 12, wherein the ligands comprise long-chain fatty amines, long-chain fatty acids, phosphoric acids, phosphine, phosphine oxides, thiols, dendrons or Dendron boxes or combinations thereof.

14. The composition of claim 1, wherein the absorption and the emission of wavelengths of the doped semiconductor nanocrystals do not overlap.

15. The composition of claim 1, wherein the doped semiconductor nanocrystals are annealed.

16. The composition of claim 1, wherein the doped semiconductor nanocrystals have a photoluminescent quantum yield greater than 60%.

17. The composition of claim 1, wherein the doped semiconductor nanocrystals have a stable dopant emission at a temperature ranging from about 80° C. to about 145° C.

18. The composition of claim 1, wherein the shell has a thickness greater than 3 nm.

19. The composition of claim 1, wherein the semiconductor nanocrystals are as-prepared.

20. A composition comprising a plurality of doped semiconductor nanocrystals having a dopant emission, the doped semiconductor nanocrystals comprising a core comprising at least one dopant and a shell substantially surrounding the core, wherein the doped semiconductor nanocrystals are free of surface doping and have a photoluminescent quantum yield ranging from 12% to 50% at a temperature ranging from about 80° C. to about 105° C.

21. The composition of claim 20, wherein greater than 99% of the photoluminescent quantum yield is the dopant emission.

22. The composition of claim 20, wherein the core comprises a metal and a non-metal.

23. The composition of claim 22, wherein the non-metal comprises an element selected from Group V, VI or VII of the Periodic Table.

24. The composition of claim 22, wherein the non-metal comprises Se, O, P or S.

25. The composition of claim 22, wherein the metal comprises an element of Group I, II, III or IV of the Periodic Table or a transition metal.

26. The composition of claim 22, wherein the metal is selected from the group consisting of Zn, Ga, and In.

27. The composition of claim 20, wherein the dopant comprises a metal or a non-metal.

28. The composition of claim 27, wherein the metal is a transition metal or rare earth metal.

29. The composition of claim 28, wherein the transition metal is Cu, Ag, Fe, Cr or Mn.

30. The composition of claim 28, wherein the dopant is present in the core in an amount of up to 30%.

31. The composition of claim 20, wherein the semiconductor nanocrystals are as-formed.

32. A composition comprising a plurality of doped semiconductor nanocrystals, the doped semiconductor nanocrystals comprising a core comprising an Mn dopant and shell comprising ZnSe substantially surrounding the core, wherein the doped semiconductor nanocrystals are free of Mn surface doping and have a stable dopant emission at a temperature ranging from about 41° C. to about 174° C., the dopant emission accounting for greater than 99% of photoluminescence from the nanocrystals.

33. The composition of claim 1, wherein the doped semiconductor nanocrystals have a photoluminescent quantum yield ranging from 12% to 50%.

34. The composition of claim 32, wherein the doped semiconductor nanocrystals have a stable dopant emission ranging from about 80° C. to about 105° C.

35. The composition of claim 32, wherein the doped semiconductor nanocrystals have a stable dopant emission ranging from about 105° C. to about 145° C.

* * * * *